United States Patent [19]

Pick et al.

[11] Patent Number: 4,844,112
[45] Date of Patent: Jul. 4, 1989

[54] ELECTRICALLY OPERATED VALVE ASSEMBLY

[75] Inventors: James M. Pick; Wesley S. Swanson, both of Elk Grove Village; Edward D. Hurst, Wayne, all of Ill.

[73] Assignee: Eaton Corporation, Cleveland, Ohio

[21] Appl. No.: 252,283

[22] Filed: Sep. 30, 1988

[51] Int. Cl.$^4$ ............... F16K 43/00; F16K 31/06
[52] U.S. Cl. ................. 137/15; 92/98 D; 251/30.03; 251/30.05; 251/46
[58] Field of Search ............ 137/15, 315; 251/30.02, 251/30.03, 30.04, 30.05, 45, 46; 92/96, 98 R, 98 D

[56] References Cited

U.S. PATENT DOCUMENTS

| | | | |
|---|---|---|---|
| 3,544,062 | 12/1970 | Murray | 251/45 |
| 3,593,957 | 7/1971 | Dolter et al. | 251/30.03 |
| 3,672,627 | 6/1972 | McCarty, Jr. et al. | 251/30.03 |
| 3,917,218 | 11/1975 | Marocco | 251/30.03 |
| 4,003,548 | 1/1977 | Stradella et al. | 251/45 |
| 4,175,590 | 11/1979 | Grandclement | 251/30.05 |
| 4,178,573 | 12/1979 | Swanson | 251/30.03 |
| 4,500,067 | 2/1985 | Zukausky | 251/45 |
| 4,534,537 | 8/1985 | Zukausky | 251/45 |

FOREIGN PATENT DOCUMENTS 0012118 6/1980 European Pat. Off. ......... 251/30.03
0050756 5/1982 European Pat. Off.

Primary Examiner—George L. Walton
Attorney, Agent, or Firm—R. A. Johnston

[57] ABSTRACT

An electromagnetically actuated, pilot operated valve having a nonmetallic body with a pressure responsive diaphragm for opening the main valve and defining, in cooperation with a guide member, a pilot chamber having an armature/pilot valve member movably received thereon. The guide member has a bleed-supply hole formed therein and is secured to the body by an annular member attached to the body by nonmetallic weldment and integrally defining a cup into which a solenoid coil is received over the guide member and potted by liquid-cast insulating material. An armature guide member-diaphragm subassembly has the guide with armature received therein with the diaphragm peripherally secured thereto by a ring pressed thereover, the ring interfitting with cooperating body surfaces to define restricted passage to filter flow to the pilot chamber bleed hole.

18 Claims, 1 Drawing Sheet

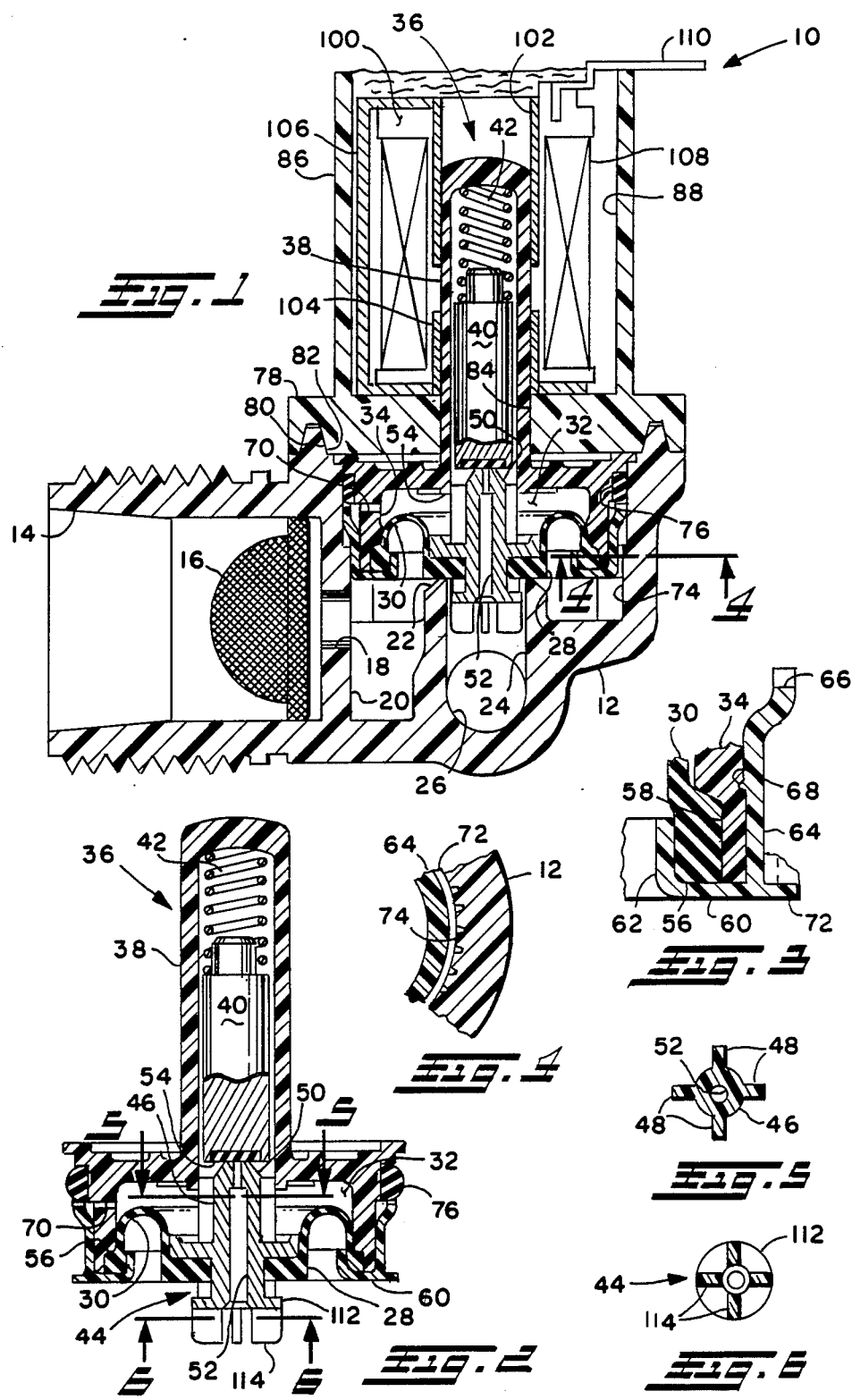

ELECTRICALLY OPERATED VALVE ASSEMBLY

CROSS REFERENCE TO RELATED APPLICATION

The present invention is related to the valve assembly described and claimed in commonly assigned U.S. Pat. No. 4,697,608.

BACKGROUND OF THE INVENTION

The present invention relates to electrically actuated and particularly solenoid operated waterfill valves for appliances such as clothes washing machines, dishwashers and automatic ice makers for refrigerators. Appliances of this type, particularly those for household or domestic use, employ low power solenoids for operating the water fill valve in response to a control signal from a programmer/timer employed for controlling the service cycle of the appliance.

In designing and manufacturing such solenoid operated water fill valves for appliances, it has been common practice to wind the solenoid coil of several thousand turns of fine magnet wire on a bobbin and pressure encapsulate the coil in a mold with injection of thermoplastic material. This type of solenoid construction has proven to be costly and difficult to control in high volume mass production of appliance water valves. In particular, the pressure of the heated thermoplastic during the encapsulation often results in movement and breakage of the fine wire of the coil resulting in scrappage of the coil after encapsulation. Furthermore, the encapsulation of the coils in a mold is a batch process and is inherently limited in production rate and thus adds to the manufacturing costs of the valve.

Heretofore, solenoid operated appliance water valves for appliances requiring high water fill flow rates have utilized a pilot operator to permit differential pressure across a diaphragm to provide the necessary force to open the main valve. This type of valve requires only a small force from the solenoid to operate the pilot valve. Typically, solenoid actuated pilot operated appliance water valves employ a pilot valve seat and passage through the diaphragm in order to provide water flow from the pilot passage to create the pressure differential across the diaphragm required to open the main valve.

Pilot operated valves of this type have utilized a plurality of small spaced apertures in the diaphragm to provide the bleed flow necessary to resupply the pilot chamber for equalizing the pressure across the diaphragm to enable the main valve to close when the pilot valve is closed. The small spaced holes in the diaphragm for providing bleed flow to the pilot passage have been the source of problems in appliance water valves inasmuch as foreign particles in the water supply can plug the bleed holes and cause insufficient water flow to the pilot passage and failure of the valve to close. Furthermore, the molding or punching of a small bleed passages through the diaphragm has proved to be a costly and difficult process to control in the molding of the elastomeric diaphragm.

Thus, it has long been desired to find a way or means of eliminating the pilot chamber bleed holes from the elastomeric diaphragm in a solenoid actuated pilot operated appliance water valve. It has also been desired to provide a simple and cost effective way of insulating the solenoid coil in such a water valve without exposing the fine coil wire to excessive pressures during thermoplastic encapsulation.

SUMMARY OF THE INVENTION

The present invention provides a unique construction for a solenoid operated appliance water valve. The invention is particularly applicable for such a valve of the type actuated by an electromagnetic solenoid operating a ferromagnetic pilot valve to release pressure from a pilot chamber thereby creating a differential pressure across a diaphragm for providing the force required for opening the main valve. The valve body of the present invention is formed of plastic material and the pilot chamber is created by a plastic armature guide assembled to a flexible diaphragm for forming the pilot chamber. The armature guide and diaphragm are provided in a unique subassembly which is retained on the body by an annular member received over the guide and secured to the body by non-metalic weldment. The annular retaining member has formed integrally therewith a coil-receiving cup which has the electromagnetic coil received therein surrounding the armature guide; and, the coil is secured and insulated in the cup by liquid cast preferably resinous potting material.

The armature guide subassembly has a ferromagnetic armature received in a closed-end guide tube with the opened end thereof enlarged in diameter and having the periphery of the diaphragm sealed thereabout by an annular ring member frictionally engaged thereover. The diaphragm includes a rigid plastic means forming a pilot valve seat for the armature and a pilot passage which extends therethrough to the opposite side of the diaphragm from the armature.

In a unique feature of the invention, the pilot chamber resupply, or bleed, passage is formed in the stationary armature guide as opposed to the previous practice of providing plural spaced tiny bleed holes formed through the diaphragm for providing filtered flow to the pilot chamber.

In another unique aspect of the present invention, filtered flow to the pilot chamber resupply or bleed passage, from the main valving chamber, is provided by a plurality of circumferentially spaced grooves in the body closed by the periphery of formed spaces between lands molded about the inner periphery of the body. A resilient peripheral flange on the enlarged diameter portions of the armature guide is deflected upon installation of the armature guide-diaphragm subassembly into the body by contact with the inner end of the lands to provide a plurality of circumferentially spaced filtering passages through the grooves.

The present invention thus eliminates the problems of forming an encapsulated solenoid coil wherein molding pressures have been responsible for breakage of the coil wires by utilizing a coil received in an integrally formed cup in the armature guide retaining member and liquid cast potting the coil for insulation and retainment. The pilot chamber bleed supply passage is provided in the stationary armature guide rather than through the flexible diaphragm; and, filtering of the flow to the pilot chamber bleed passage is provided by stationary grooves in the body disposed about the armature guide subassembly rather than forming holes in the diaphragm.

BRIEF DESCRIPTION OF THE DRAWINGS

FIG. 1 is a cross-section of an electromagnetically actuated pilot operated appliance water valve employing the features of the present invention;

FIG. 2 is an enlarged view of the armature guide-diaphragm subassembly of the embodiment of FIG. 1;

FIG. 3 is an enlarged portion of the view of FIG. 2 illustrating the annular ring retaining the diaphragm on the armature guide as a subassembly;

FIG. 4 is an enlarged portion of a section view taken along section indicating lines 4—4 of FIG. 1;

FIG. 5 is a portion of a section view taken along section indication lines 5—5 of FIG. 2; and FIG. 6 is a section view taken along section indicating lines 6—6 of FIG. 2.

DETAILED DESCRIPTION

Referring to FIG. 1, the valve assembly of the present invention is indicated generally at 10 and has a body 12 formed of suitable plastic material having an inlet 14 equipped with a filter screen 16 for trapping foreign particles which supplies flow to an inlet orifice 18 to an annular valving chamber 20 having formed therein an annular main valve seat 22 which is valved for controlling flow through passage 24 to an outlet port 26.

Flow over the main valve seat 22 is controlled by movement of a main valve member comprising the thickened central portion 28 of a flexible elastomeric diaphragm 30 which contacts the seat 22 in the closed position and is spaced therefrom in the open position. Diaphragm 30 is sealed about its outer periphery in a manner which will hereinafter be described in greater detail, for providing the lower wall of a pilot valving chamber 32. The upper wall of the pilot chamber is defined by an enlarged diameter portion 34 of an armature guide member indicated generally at 36 having a smaller diameter tubular closed upper end portion 38.

In the present practice of the invention the armature guide member 36 has the smaller diameter 38 and larger diameter portions 34 formed integrally of suitable plastic material. A ferromagnetic armature member 40 is slidably received in the closed end tubular portion 38 of the guide 36, and the armature 40 is biased in a downward direction by a spring 42.

Referring to FIGS. 1 and 2, the armature guide-diaphragm subassembly is shown wherein the diaphragm 30 has an insert indicated generally by reference numeral 44 received through the thickened central portion 28 of the diaphragm thereof a insert being formed of suitable rigid plastic material. The upper portion of the insert 44, disposed on the interior of the pilot chamber 32 extends upwardly preferably into the smaller diameter tubular portion 38 for sliding engagement with the interior thereof. The transverse section of the upper portion 46 of the insert is shown in FIG. 5 and has a plurality of flutes 48 provided thereabout for permitting free flow of water and for sliding engagement with the interior of the upper portion 38 of the armature guide.

The upper portion 46 of the diaphragm insert has a pilot valve seat 50 provided on the upper end thereof with a pilot flow passage 52 extending from the seat downwardly through the insert for communication with the outlet passages 24, 26. The armature 40 has a suitable elastomeric valve pad 54 provided on the lower end thereof for valving contact with the pilot seat 50.

Referring to FIGS. 2 and 3, the outer periphery of diaphragm 30 has formed integrally thereon a bead rim 56 which is received in a groove 58 provided in the enlarged diameter portion 34 of the armature guide 36. Bead rim 56 is compressed and retained in the armature guide groove 58 by a retaining ring 60 which has a generally U-shaped configuration in transverse section. The retaining ring 60 has the radially inward leg 62 of the generally U-shaped configuration extending upwardly as shown in FIG. 3, for substantially the full depth of the bead rim 56 on the diaphragm. The radially outwardly disposed leg 64 of the generally U-shaped ring 56 extends upwardly as shown in FIGS. 2 and 3 above the bead rim 56 and is flared outwardly radially as shown in FIG. 3. The upper end of the leg or annular wall 64 has its edge castellated to provide a plurality of circumferentially spaced notches 66.

It will be understood that the pilot chamber 32 is thus formed by the interior of the armature guide 36 and diaphragm 30 when the ring 60 has been installed to seal the bead rim 56 of the diaphragm onto the enlarged diameter portion 34 of the armature guide 36. Optionally, if desired, a small annular rib 68 may be provided on the interior of the outer wall 64 of ring 60 for providing frictional engagement with a corresponding groove in the portion 34 of the armature guide to provide a frictional engagement and retention of the ring 60 onto the portion 34 of the armature guide.

Referring to FIGS. 1 and 2, the pilot valving chamber 32 is supplied continuously with water through a very small diameter controlled bleed passage 70 formed radially through the side of the enlarged diameter portion 34 of the armature guide. It will be readily understood by those skilled in the art that the diameter of the bleed passage 70 is chosen to be substantially smaller than that of the pilot passage 50 in order that the pilot passage cannot be replenished and pressurized when pilot valve 54 is raised from the seat 22 to the open position permitting flow from pilot chamber 32 through outlet passage 52.

Referring to FIG. 3, another unique feature of the invention is shown wherein the retaining ring 60 has a radially outwardly extending generally thin resiliently deformable flange 72 provided thereabout. Flange 72 is deformed from the position indicated in solid outline in FIG. 3 to the position indicated in dashed outline when the armature guide subassembly of FIG. 2 is received into the body 12 whereupon flange 72 is deformed by pressing into contact with the wall of the main valving chamber.

With reference to FIG. 4, the outward edge of flange 72, formed on the outer wall 64 of ring 60, is pressed against edges of a plurality of circumferentially spaced ribs formed on the inner periphery 74 of the valving chamber in the body such that the flange 72 seals thereagainst and permits flow from the main valving chamber to the bleed hole 70 pass through the small grooves formed between the ribs 74. The flow through the grooves between ribs 74 is thus the only path of fluid from the main valving chamber upwards about the exterior of the armature guide and through the notches 66 for supplying the bleed passage 70. It will thus be understood that the grooves formed between ribs 74 provide a filtering function for foreign particles which might pass through screen 16. By virtue of the large number of the spaces between ribs disposed about chamber wall 74, a flow velocity about the circumference of the flange 72 is very low with respect to the flow through bleed passage 70; and, thus there is minimized the tendency of very fine foreign particles trapped the filtering spaces between ribs 74 to reduce flow to bleed passage 70.

When the armature guide is received in the body as shown in FIG. 1, a suitable elastomeric O-ring 76 is received over the armature guide assembly and is supported by the castellated rim of the flared portion of the outer wall 64 of ring 60. The O-ring 76 thus seals about the exterior of the large diameter portion 34 of the armature guide and the body 12.

Referring to FIG. 1, the armature guide subassembly is retained in the body by a retaining means including means defining a coil receiving cup, which in the presently preferred practice comprises a retaining member 78 which has an annular groove 80 formed therein and received over a correspondingly shaped annular projection 82. The annular retaining member 78 has a central aperture 84 which is received over the tubular portion 38 of the armature guide in closely fitting arrangement. The retaining member 78, which is formed of suitable plastic material, preferably similar to the material of body 12, is secured to the body by non-metallic weldment as for example, by spin welding.

The retaining member 78 has an upwardly extending tubular wall portion 86 formed integrally thereon and providing and defining a cup 88 opened at its upper end.

A solenoid coil assembly comprising a bobbin 100 and having axially spaced tubular ferromagnetic pole pieces 102, 104 and a suitable ferromagnetic pole frame 106 is received over the armature guide tube 38 in cup 88. The bobbin has an electrical coil 108 wound thereabout, typically with several thousand turns of fine magnet wire with electrical terminations such as that shown at 110 extending outwardly over the top edge of cup 88 and adapted for external electrical connection thereto. The solenoid coil 108 is insulated and retained in the cup 88 by liquid casting of preferably resinous potting material, as for example, a polyester resin material. If desired, the liquid cast resinous potting material may be partially filled with suitable inert fibrous or particulate filler materials.

Referring to FIGS. 2 and 6, the lower portion of the diaphragm insert 44 is shown in its preferred form as having a circular flange 112 formed thereon which flange has its outer periphery sized generally closely fitting with the interior of the outlet bore 24 in the valve body. A plurality of circumferentially spaced radially extending guide flutes 114 slidably engage the interior of the outlet passage 24 for guiding the movement of the diaphragm insert 44. The circular flange 112 defines an annular orifice with the wall of outlet passage 24; and, the annular orifice provides a highly restricted passage for water as the main valve nears the fully closed position and serves to provide hydraulic shock protection for the valve in the event of hydraulic transients, often referred to as water-hammer, in the water system. The circular flange 112 is preferably spaced from the main valve seat 28 by an amount sufficient to pass any particle which can pass through screen 16.

In operation, main valve seat 22 comprising central diaphragm portion 28 is closed as shown in FIG. 1 and armature pad 54 is seated on pilot seat 50 by the downward urging of armature 40 under the compressive force of spring 42. Upon energization of coil 108, the magnetomotive force generated by current flowing in the coil lifts armature 40 in the upward direction lifting the pilot valve pad 54 from seat 50 and permitting water from pilot chamber 32 to discharge to the outlet through passage 52. It will be understood that makeup water from the valving chamber communicating with inlet 18 continues to flow through the bleed passage 70 into the pilot chamber but cannot make up for the loss of water flow through pilot outlet passage 52. A pressure differential is thus created across diaphragm 30 by virtue of the line pressure of the water in the main valving passage, the pressure differential then lifting the diaphragm central portion 28 upwardly away form valve seat 22 permitting a greater flow to outlet 26. When current flow is cut off to coil 108, armature 40 is urged downwardly by spring 42 and pad 54 closes pilot seat 50 and flow through bleed passage 70 equalizes pressure across the diaphragm 30. Equalization of the pressure across diaphragm 30 permits spring 42 to drive the diaphragm downwardly to seat on main valve seat 22 closing the main valve.

The present invention thus provides a unique construction for an electric valve having an armature guide retained on a plastic body by nonmetalic weldment of an annular retainer which integrally defines a cup for receiving a solenoid coil. The coil is received in the cup and insulated and retained therein by liquid casting of a suitable potting compound. An armature guide subassembly has the valving diaphragm peripherally secured thereto by a bead ring compressed and retained thereon by an annular retaining ring. In the pilot operated version of the valve of the present invention, the armature and pilot valve are provided within a pilot valving chamber formed between the diaphragm and the armature guide and the pilot chamber is supplied by a bleed supply hole provided in the stationary armature guide rather than through the flexible elastomeric diaphragm. The pilot bleed supply hole is supplied from the main valving chamber by flow filtered about the armature guide and between a plurality of circumferentially spaced small passages provided in the body to provide low velocity flow and prevent passage of foreign material to the region of the bleed supply hole. Resiliently deforming a thin annular flange provided on the armature guide when the guide and diaphragm assembly is pressed into the body provides the inner wall for the small passages comprising a plurality of grooves in the body.

Although the invention has been described with respect to the illustrated embodiments, it will be understood that the invention is capable of modification and variation and is limited only by the following claims.

We claim:

1. An electrically actuated, pilot operated valve assembly comprising:
   (a) body means formed of a non-metallic material and defining a valving chamber communicating with an inlet and an outlet, said chamber having a main valve seat formed therein for valving flow thereover between said inlet and outlet;
   (b) guide means formed of non-magnetic material received on said body means and sealed thereabout for forming a closure for said valving chamber, said guide means defining a portion thereof forming a guide surface, with a ferromagnetic armature slidably received thereagainst and guided thereby, said guide means having certain portions thereof defining a pilot valving chamber;
   (c) flexible diaphragm means sealed about said certain portions for providing a closure for said pilot chamber, said diaphragm means movable for contacting said main valve seat and including means defining a pilot valve seat valved by said armature, and operable for communicating said pilot chamber with said outlet when said armature is moved away from said pilot seat;

(d) said certain portions of said guide means defining a bleed port continuously communicating said inlet with said pilot chamber;

(e) annular retaining means formed of non-metallic material received over said guide means and secured to said body means by non-metallic weldment for retaining said guide means, said annular retaining means including means defining a coil receiving cup about said guide means;

(f) an electrical coil received in said cupped configuration over said guide means with said armature means disposed within said coil; and, (g) potting material disposed over said coil for insulating and permanently retaining said coil in said cup.

2. The valve assembly defined in claim 1 wherein said retaining means and said means defining said cup are formed of plastic material as a unitary member.

3. The valve assembly defined in claim 2 wherein said body means is formed of plastic material and said retaining means is formed as an integral member formed of plastic material similar to said body means material.

4. The valve assembly defined in claim 2, wherein said body means defines in cooperation with said enlarged diameter portion of said guide means, a plurality of restrictive passages for filtering flow from said valving chamber to said bleed passage.

5. The valve assembly defined in claim 2, wherein said diaphragm means includes an insert formed of rigid material and having said pilot valve seat thereon and said pilot passage therethrough 6. The valve assembly defined in claim 2, wherein said diaphragm means includes an insert formed of substantially rigid material with said pilot passage therethrough and having a depending portion extending into said outlet, said depending portion defining with said body means outlet a controlled-clearance annular orifice for hydraulic shock suppression.

7. The valve assembly defined in claim 1, wherein said diaphragm means includes an insert formed of substantially rigid material and having a riser portion extending into said pilot chamber and slidably contacting said guide means for being movably guided thereby, with said pilot valve seat formed on said riser portion.

8. An electromagnetically actuated valve assembly comprising:

(a) body means formed of non-metallic material defining a valving cavity communicating with an inlet and outlet, and a valve seat means with a valve member movable with respect thereto for controlling flow between said inlet and outlet;

(b) guide means formed of non-magnetic material sealing said cavity and including armature means received therein and guided for movement for effecting movement of said valve member;

(c) annular retaining means formed of non-metallic material received over said guide means and attached to said body means by non-metallic weldment for retaining said guide means, said retaining means defining an open coil cavity about said guide means;

(d) electrical coil means received in said open coil cavity over said guide means and operable upon electrical energization to magnetically effect movement of said armature means; and, (e) potting material disposed about said coil for insulating and permanently retaining said coil in said coil cavity.

9. The valve assembly defined in claim 8 wherein said retaining means and said body means are formed of a common plastic material.

10. The valve assembly defined in claim 8, wherein said retaining means is formed as a unitary member of plastic material with said coil cavity formed integrally therein.

11. The valve assembly defined in claim 8 wherein said coil is potted with fluid-cast resinous material substantially room temperature curing.

12. The valve assembly defined in claim 8 wherein said body means includes means defining in cooperation with said guide means a filtering means for filtering flow between said valving chamber and said bleed passage.

13. The valve assembly defined in claim 8 wherein said body means includes filtering means defining, in cooperation with said guide means, a plurality of circumferentially spaced restrictive filtering passages for filtering flow from said valving chamber to said bleed passage.

14. A subassembly for an electromagnetically actuated pilot operated valve comprising:

(a) an integral guide member formed of non-magnetic material having a hollow tubular portion closed at one end and an enlarged diameter annular portion at the end opposite said closed end;

(b) a ferromagnetic pilot valve member slidably received in said closed end tubular portion;

(c) a flexible diaphragm means received on said guide member and having the periphery thereof sealing about said enlarged diameter annular portion thereby forming a pilot valving chamber within said guide member, said diaphragm means including rigid means defining a pilot valve seat disposed for valving contact with said valve member, said rigid means defining a pilot passage to the exterior of said pilot valving chamber;

(d) said guide member enlarged diameter annular portion defining a bleed passage to said pilot valving chamber; and, (e) an annular retaining member received on and around a portion of said guide member and said diaphragm periphery for securing and for sealing said diaphragm periphery to said guide member enlarged diameter portion.

15. The subassembly defined in claim 14 wherein said annular retaining member further comprises an annular rib formed on the outer periphery, said rib adapted for resilient radial compression upon assembly of said subassembly in the body.

16. The subassembly defined in claim 14 wherein said rigid means comprises a plastic insert disosed to have portions thereof extending through the central region of said diaphragm, said pilot valve seat formed on the pilot chamber side of said rigid means and said pilot passage extending centrally therethrough.

17. The subassembly defined in claim 14 wherein said annular retaining member rib comprises a radially outwardly extending flange.

18. A method of assembling an electrically operated appliance valve comprising the steps of:

(a) providing a valve body of nonmetallic material having a valving cavity communicating with an inlet and outlet;

(b) providing a non-magnetic guide member having a movable ferromagnetic valve member therein and sealing said guide member for closure of said valving cavity;

(c) providing an annular member of nonmetallic material defining a coil receiving cup and positioning said cup over said guide member;

(d) securing said annular member to said body by nonmetallic weldment; and, (e) disposing a solenoid coil in said cup over said guide and potting said coil in said cup for insulation and retainment therein.

* * * * *